United States Patent [19]

Nanbu

[11] Patent Number: 5,420,710
[45] Date of Patent: May 30, 1995

[54] LIQUID CRYSTAL DISPLAY APPARATUS WITH DETACHABLE LIGHT SOURCE

[75] Inventor: Hajime Nanbu, Habikino, Japan

[73] Assignee: Sharp Kabushiki Kaisha, Osaka, Japan

[21] Appl. No.: 86,856

[22] Filed: Jul. 7, 1993

[30] Foreign Application Priority Data

Jul. 10, 1992 [JP] Japan .................. 4-048402 U

[51] Int. Cl.⁶ .................. G02F 1/1333; G02F 1/1335
[52] U.S. Cl. .................. 359/83; 359/49
[58] Field of Search .................. 359/83, 49; 362/26, 362/31

[56] References Cited

U.S. PATENT DOCUMENTS

| 5,040,098 | 8/1991 | Tanaka et al. | 362/31 |
| 5,126,863 | 6/1992 | Otsuka et al. | 359/41 |
| 5,146,354 | 9/1992 | Plesinger | 359/49 |
| 5,182,660 | 1/1993 | Tanaka | 359/49 |
| 5,211,463 | 5/1993 | Kalmanash | 362/26 |
| 5,214,522 | 5/1993 | Tagawa | 359/49 |
| 5,313,318 | 5/1994 | Gruenberg et al. | 359/49 |

FOREIGN PATENT DOCUMENTS

4141687 5/1992 Japan .
4213490 8/1992 Japan .................. 359/83

Primary Examiner—Anita Pellman Gross
Assistant Examiner—Charles Miller

[57] ABSTRACT

A liquid crystal display apparatus has a first supporting member for containing and supporting a liquid crystal display plate and a light guiding plate and a second supporting member for containing and supporting a light source. The first supporting member is provided separately from the second supporting member. When a coupling chip of the second supporting member is inserted in a coupling hole of the first supporting member, the first and second supporting members are integrated with each other. Since the second supporting member can be easily installed to and removed from the first supporting member, the changing of the light source can be done with ease. Additionally, since it is not required to directly handle the light source, the changing and transportation of the light source can be done with safety. Moreover, since the first supporting member is provided separately from the second supporting member, it is easier to cut off a heat generated by the light source so as not to conduct to a liquid crystal display plate and light guiding plate. Accordingly, the non-uniform displaying due to the heat of the light source can be avoided.

32 Claims, 6 Drawing Sheets

LIQUID CRYSTAL DISPLAY APPARATUS WITH DETACHABLE LIGHT SOURCE

FIELD OF THE INVENTION

The present invention relates to liquid crystal display apparatuses having a back light and particularly to a liquid crystal display apparatus of a side-lighting type wherein a light source such as a cold cathode ray tube is placed beside a liquid crystal display plate.

BACKGROUND OF THE INVENTION

Figure 5:
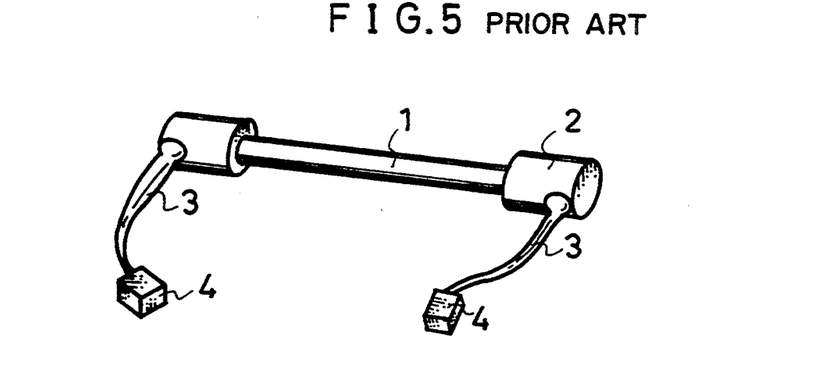
FIG. 5 is a perspective view showing a conventional general light source.

FIG. 5 shows a light source 1 which is generally used for a liquid crystal display apparatus. Both ends of the light source 1 are protected by covers 2 made of rubber. The covers also function as an attaching section. A lead wire 3 is provided through each cover 2. Each end of the lead wires 3 is provided with a harness 4.

Figure 6:
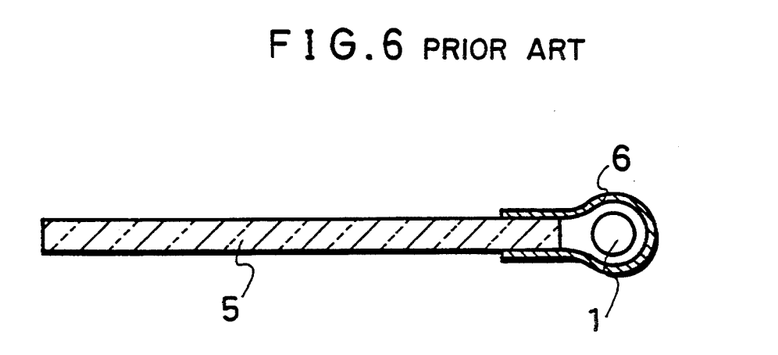
FIG. 6 is a longitudinal sectional view showing a conventional liquid crystal display apparatus wherein a light source is integrated with a light guiding plate by a reflector.
Figure 7:
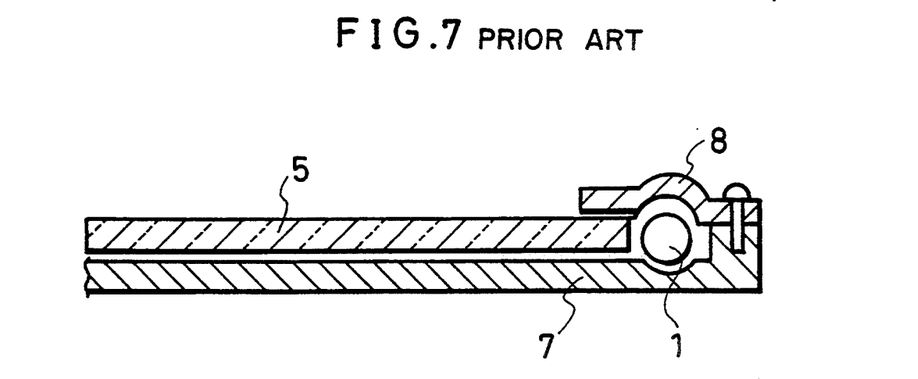
FIG. 7 is a longitudinal sectional view showing a conventional liquid crystal display apparatus wherein a light source is integrated with a light guiding plate by a chassis and a protector.
Figure 8:
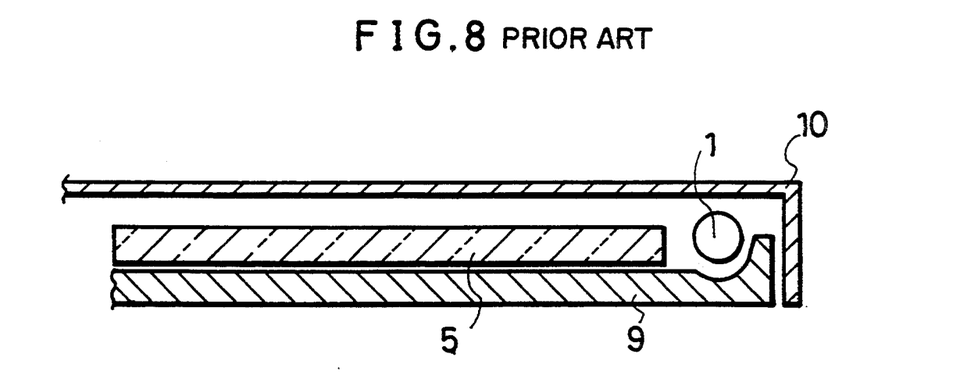
FIG. 8 is a longitudinal sectional view showing a conventional liquid crystal display apparatus wherein a light source is integrated with a light guiding plate by a chassis and an upper lid.

FIGS. 6 through 8 show respective examples where the liquid crystal display apparatus is furnished with the light source 1. Each example is of a side-lighting type wherein the light source 1 is disposed so as to be integrally mounted in the vicinity of an end of a light guiding plate 5. A sheetlike reflector 6 is provided around a light source 1 according to the example of FIG. 6. A light guiding plate 5 and a light source 1 are supported by a chassis 7 made of plastic according to the example of FIG. 7. A protecting member 8 made of plastic is screwed into the chassis 7 so as to cover the light source 1. A light guiding plate 5 and a light source 1 are supported so as to be put between a lower chassis 9 made of plastic and an upper vessel 10 made of metal made according to the example of FIG. 8.

However, the above-mentioned conventional liquid crystal display apparatus has the following problems:

(1) It is troublesome to change the light source 1. This derives from a structural problem where the light source 1 is integrally provided with either a main body of the liquid crystal display apparatus or the light guiding plate 5. Note that it is necessary to change the light source 1 in order to avoid a drop in brightness, since a cold cathode ray tube or a thermal cathode ray tube which are used for the light source 1 have a predetermined lifetime;

(2) The light source 1 required to be handled with great care. This is because the light source 1 has a fine glass tube which should be transported and handled without any cover until it is incorporated into the liquid crystal display apparatus;

(3) It is troublesome to wire the light source 1 for electricity. This is because it is required to pass the harness 4 through a leading hole (not shown) of a main body of the liquid crystal display apparatus and to fix the lead wire 3;

(4) It is hard to standardize and commonly use the light source 1. This is because the tube length of the light source 1, the length of the lead wire 3 and other dimensions are generally designed in accordance with a kind of the liquid crystal display apparatus which is furnished with the light source 1 inside thereof;

(5) The structure of the respective members 6 to 10 which are disposed around the light source 1 is complicated. This is because each of the members 6 to 10 has (1) structure where the light from the light source 1 is converged onto the light guiding plate 5 in order to increase the brightness of back light and (2) the structure where the light source 1 is integrally provided with either the main body of the liquid crystal display apparatus or the light guiding plate 5; and (6) The heat of the light source 1 is conducted to the liquid crystal display plate, thereby sometimes inducing a so-called voiding phenomenon. This is because in the case where the light source 1 is integrally provided with either the main body of the liquid crystal display apparatus or the light guiding plate 5, it is hard to thermally insulate the liquid crystal display plate from the light source 1, thereby resulting in that a temperature characteristic of the liquid crystal display plate is badly affected by the heat of the light source 1.

SUMMARY OF THE INVENTION

It is an object of the present invention to provide a liquid crystal display apparatus capable of changing a light source with ease and safety.

It is another object of the present invention to provide a liquid crystal display apparatus which simplifies the structure of members around a light source and easily standardize the members.

It is still another object of the present invention to provide a liquid crystal display apparatus capable of avoiding heat from the light source from being conducted to a liquid crystal display plate.

In order to achieve the foregoing objects, the present invention is characterised by having at least the following means:

(1) light guiding means for guiding light to a rear surface of the liquid crystal display plate, the light guiding means having a first side face for receiving the light incident thereon;

(2) light source means for projecting the light toward the first side face, the light source means being placed beside the light guiding means;

(3) first supporting means for supporting the light guiding means;

(4) second supporting means for supporting the light source means; and (5) coupling means for coupling the first and second supporting means so as to freely install and remove with each other.

With the arrangement, the second supporting means can be installed to and removed from the first supporting means in the state where the light source means is supported, since the first supporting means is coupled to the second supporting means by the coupling means so as to freely install and remove with each other. Accordingly, even in the case where the light source means has a fine glass tube, it is not necessary to directly handle the glass tube during the changing of light source means. The changing of the light source means can be carried out only by the changing of the second supporting means. So, it is simplified to furnish and wire the light source means. As a result, the changing of the light source means can be carried out with ease and safety.

The light source means can be transported such that the second supporting means supports the light source means, i.e., such that the light source is protected by the second supporting means. Accordingly, there is no possibility that the light source means is damaged during the transporting process, thereby resulting in that the transportation of the light source means is carried out with ease and safety.

The second supporting means is arranged by the respective members around the light source means so as to be removable from the liquid crystal display apparatus. Accordingly, the members around the light source means can be handled as only one part, thereby making it easier to standardize the members around the light source means.

Further, the light guiding means is separated from the light source means by the first and second supporting means. Accordingly, the first and second supporting means are thermally insulated with ease such that the heat generated by the light source means is not conducted therebetween. For instance, (1) when the first supporting means, the coupling means and the second supporting means are made of a thermally insulating material and/or (2) when a light transmitting material is intervened between the first and second supporting means, the effect that the heat generated by the light source means is thermally insulated can be enhanced. When the heat of the light source means is thus not conducted to the light guiding means, the heat is not also conducted to the liquid crystal display plate. Accordingly, the occurrence of the non-uniform displaying due to the heat of the light source means can be avoided.

For a fuller understanding of the nature and advantages of the invention, reference should be made to the ensuing detailed description taken in conjunction with the accompanying drawings.

DESCRIPTION OF THE EMBODIMENTS

The following description deals with one embodiment of a liquid crystal display apparatus of the present invention with reference to FIGS. 1 through 4.

Figure 1:
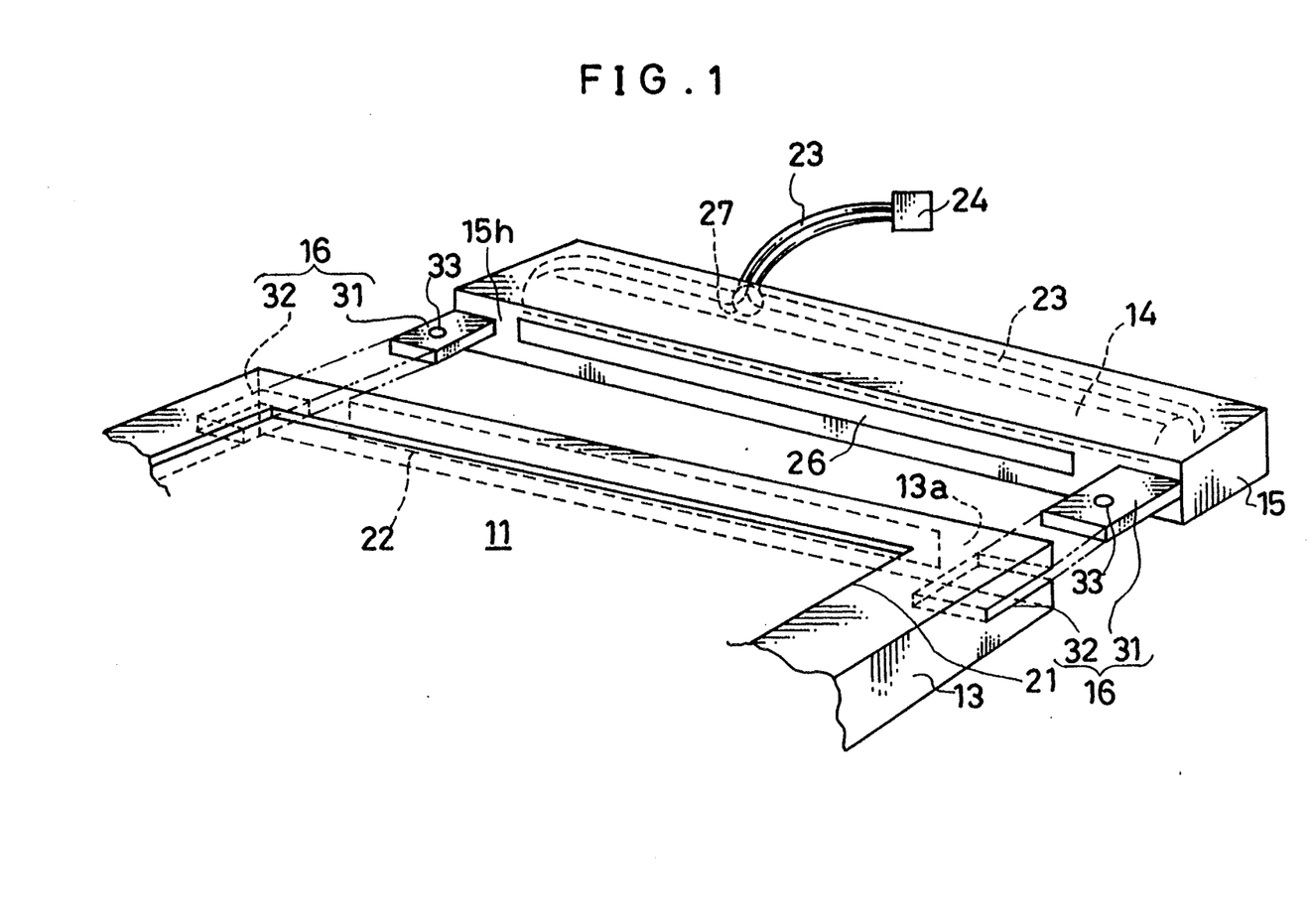
FIG. 1 is a perspective view showing one structural example of a main portion of a liquid crystal display apparatus in accordance with the present invention.
Figure 2:
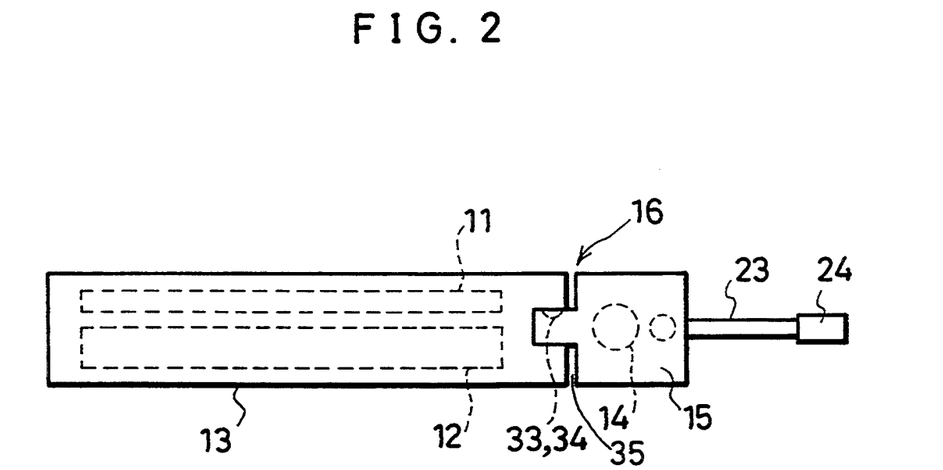
FIG. 2 is a side view of the liquid crystal display apparatus shown in FIG. 1.

As shown in FIGS. 1 and 2, a liquid crystal display apparatus of the present embodiment is provided with a liquid crystal display plate 11 (a liquid crystal panel), a light guiding plate 12 (light guide), a first supporting member 13, a light source 14, a second supporting member 15 and joints 16.

The liquid crystal display plate 11, as usual, is arranged such that a pair of light transmitting electrode and polarizing plate are luminated on respective front surface and rear surface of a liquid crystal layer. The liquid crystal display plate 11 and driving circuits therearound are both furnished inside the first supporting member 13.

The light guiding plate 12 is disposed in a rear surface side of the liquid crystal display plate 11 so as to be parallel to the liquid crystal display plate 11. The light guiding plate 12 is made of a plate-like transparent acrylic resin for instance. It is preferable that a diffusion sheet of white color is adhered to a front surface of the light guiding plate 12 while a reflecting sheet of specular or white color is adhered to the rear surface of the light guiding plate 12.

The first supporting member 13 is a framed member made of an engineering plastic, having a low heat transfer rate, such as polycarbonate or ABS resin. A displaying window 21 formed on the first supporting member 13 has a size which corresponds to a regional area of the effective displaying area of the liquid crystal display plate 11. The first supporting member 13 may be divided into upper and lower sections. The liquid crystal display plate 11 and the light guiding plate 12 are caught between the upper and lower sections, the upper and lower sections are screwed with each other. For instance, inside each section there is provided with a rib for fixing the liquid crystal display plate 11 and the light guiding plate 12. Further, a side face 13a of the light source 14 side of the first supporting member 13 is provided with a first slit 22 for receiving light from the light source 14 which is designed so as to correspond to a thickness of the light guiding plate 12. The sealing of the first slit 22 with a light transmitting plate is preferable for cutting off the heat of the light source 14.

The light source 14 is a cold cathode ray tube (CCRT) of straight pipe type for instance. The light source 14 is disposed so as to be parallel to the side face 13a. Lead wires 23 are extended from respective ends of the light source 14. A top end of the lead wire 23 is provided with a harness 24.

The second supporting member 15 contains the light source 14 therein so as to protect it. The second supporting member 15 is made of an engineering plastic having a low heat transfer rate like the first supporting member 13. The first supporting member 13 has a thickness which coincides with that of the second supporting member 15. Additionally, the first supporting member 13 has a width, along an elongate direction of the light source 14, which coincides with that of the second supporting member 15. A side face 15h of the second supporting member 15 which faces to the side face 13a is provided with a second slit 26 for light projection purpose, the size of the second slit 26 being the same as that of the first slit 22. Further, the side face 13a is slightly set apart from the side face 15h by a clearance 35 so as not to be in contact with each other (see FIG. 2). Like the case of the first slit 22, the sealing of the second slit 26 with a light transmitting plate is preferable for cutting off the heat of the light source 14.

Figure 3:
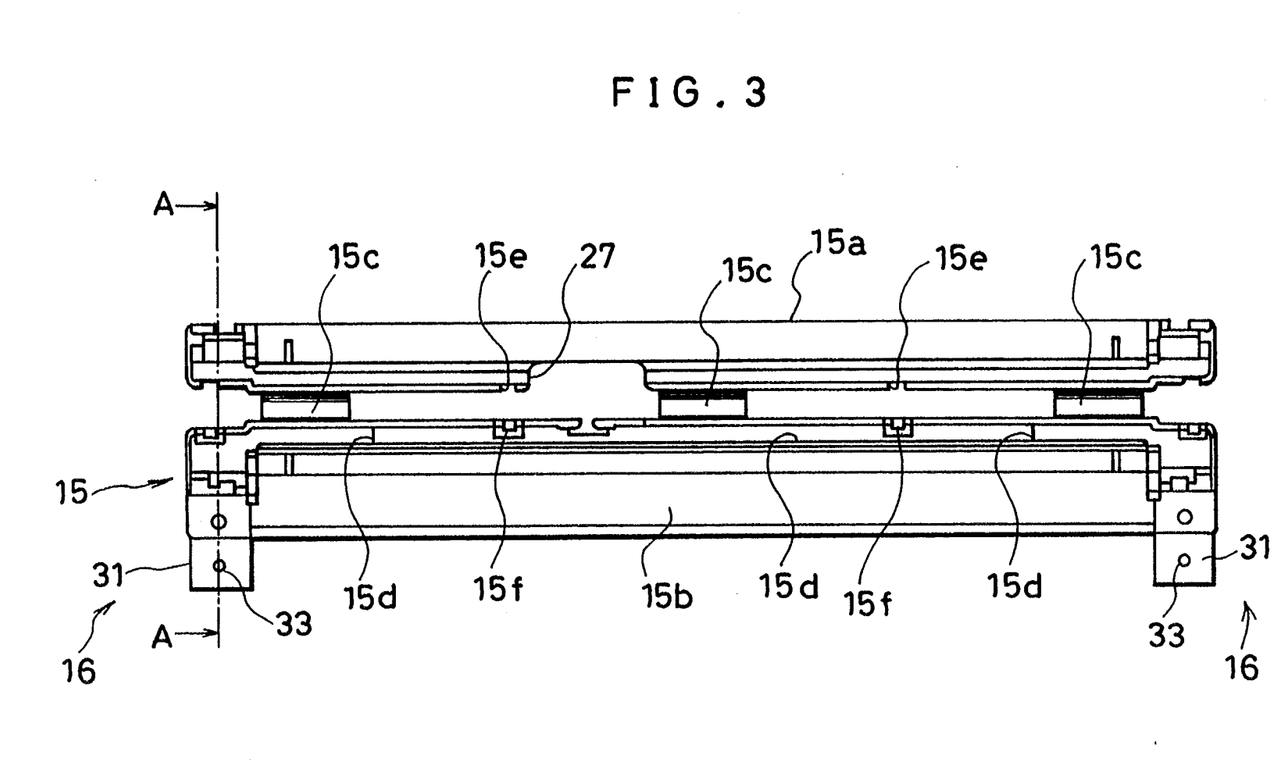
FIG. 3 is a plan view showing a second supporting member with the upper portion thereof opened.
Figure 4:
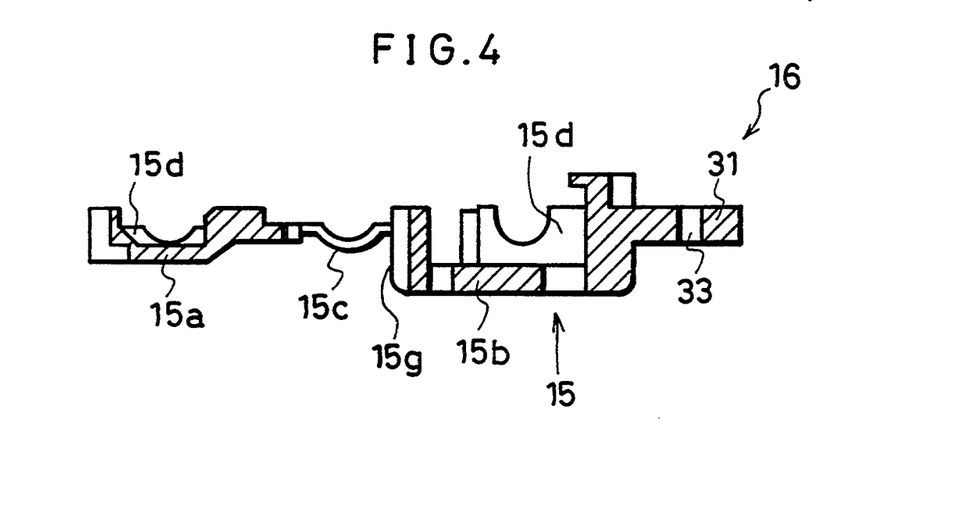
FIG. 4 is a longitudinal sectional view taken along the lines A—A of the second supporting member shown in FIG. 3.

As shown in FIGS. 3 and 4, the second supporting member 15 is divided into upper and lower sections 15a and 15b which catches the light source 14 therebetween. The upper section 15a is coupled to the lower section 15b by a coupling section 15c made of metalic material. The coupling section 15c is formed so as to bend. An upper section of a side face 15g of the lower section 15b is provided with the coupling section 15c. The side face 15g forms one part of a rear surface of the second supporting member 15 from the light guiding plate 12 side view. As shown in FIG. 3, an upper side of the side face 15g is provided with clicks 15f. One side of the upper section 15a which is overlapped with the upper side is provided with a concave section 15e so as to correspond to the click 15f. The upper and lower sections 15a and 15b are integrated by the coupling of the click 15f and the concave section 15e. Each inside face of the upper and lower sections 15a and 15b is provided with a rib 15d or other member for fixing the light source 14. The rear surface of the second supporting member 15 is provided with a hole 27 (see FIG. 1) for extending the lead wire 23 of the light source 14 therethrough. The hole 27 may be formed in the upper section 15a. The hole 27 fixes the lead wire 23 such that the lead wire 23 is caught by the hole 27. Accordingly, there is no possibility for the lead wire 23 to be removed even when the lead wire 23 is pulled.

The joints 16 are composed of a coupling chips 31 formed in the second supporting member 15 and a coupling hole 32 formed in the first supporting member 13 respectively. The joint 16 couples the first and second supporting members 13 and 15 so as to freely install and remove with each other. The coupling chip 31 is made of an engineering plastic having a low heat transfer rate like the supporting members 13 and 15. The coupling chip 31 is integrated with the second supporting member 15 by the metal mold casting. The coupling hole 32 is also formed as one part of the first supporting member 13 by the metal mold casting.

More concretely, the coupling chips 31 are disposed at both sides of the second slit 26 on the side face 15h of the second supporting member 15 so as to protrude in a horizontal direction. The protruding length of the coupling chip 31 is substantially the same as a depth of the coupling hole 32. Note that (1) the protruding length of the coupling chip 31 can be slightly longer than the depth of the coupling hole 32 or (2) the respective shapes of coupling chip 31 and coupling hole 32 can be adjusted such that the clearance 35 is provided between the first and second supporting members 13 and 15. A small hole 33 (see FIGS. 1, 3 and 4) is formed around the center of the coupling chip 31. Inside the coupling hole 32 there is provided with a protrusion 34 having a shape of hemispherical (see FIG. 2) in correspondence with the small hole 33. A height of the protrusion 34 is set such that the surrounding of the coupling hole 32 of the first supporting member 13 is elastically deformed during pulling the second supporting member 15 from the supporting members 13 and the coupling chip 31 can be released. When the coupling chip 31 is inserted in the coupling hole 32, the protrusion 34 is coupled to the small hole 33, thereby resulting in that the coupling chip 31 is hard to be removed from the coupling hole 32.

With the arrangement, when changing the light source 14 which reaches its predetermined lifetime in order to avoid the drop in brightness, it is the only thing to be done that an old second supporting member 15 is taken out from the first supporting member 13 by decoupling of the coupling chip 31 and the coupling hole 32 and a new second supporting member 15 is installed to the first supporting member 13. Accordingly, there is no possibility of damage unlike the case where a light source having the fine glass is directly changed. Further, the lead wire 23 is already contained in the second supporting member 15 and the harness 24 is taken out from the second supporting member 15, thereby finishing the wiring operation very easily. This results in that the changing of the light source 14 is carried out with ease and safety.

The transportation of the light source 14 can be carried out apart from the first supporting member 13, i.e., the light source 14 can be transported in the state where the light source 14 is contained in the second supporting member 15. So, it is not necessary to pay a careful attention not to damage the glass tube of the light source 14 and is not necessary to directly handle the light source 14, thereby making the transportation easy and safe.

When a liquid crystal display apparatus is used, the light source 14 first projects light and the projected light is directed to the edge surface of the light guiding plate 12 through the second slit 26 and the first slit 22. Thereafter, the guided light is directed from the edge surface of the light guiding plate 12 toward inside the light guiding plate 12. The light is projected toward the rear surface of the liquid crystal display plate 11 with the total reflection within the light guiding plate 12.

In that case, the light source 14 generates a heat and the heat is conducted to the second supporting member 15. However, (1) the first and second supporting members 13 and 15 are made of the respective materials having a low heat transfer rate, (2) the clearance 35 for cutting off the heat is provided between the first supporting member 13 and the second supporting member 15, and (3) the coupling chip 31 which couples the first supporting member 13 with the second supporting member 15 is also made of the material having a low heat transfer rate. Accordingly, as described above, the heat of the light source 14 is hard to transfer from the second supporting member 15 to the first supporting member 13. Additionally, when the first and second slits 22 and 26 are sealed by the respective light transmitting plates, the heat cutting off is much more effectively achieved.

As a result, it is avoidable that a local temperature rise of one part of the liquid crystal display plate 11 is occurred. Accordingly, the non-uniform of the displaying density such as the voiding phenomenon is reduced, thereby improving the displaying quality.

Further, the light leakage around the light source 14 can be extremely suppressed when the first and second slits 22 and 26 are appropriately designed, since the light source 14 is preliminarily contained inside the second supporting member 15. Accordingly, with the simple structure, it can be maintained that the light is so effectively used.

Additionally, when the second supporting member 15 and the joint 16 are standardized as a standard specification, other light sources 14 and second supporting members 15 having the same specifications respectively can be commonly used even in the case where another type of liquid crystal display apparatus is adopted. As a result, the handling of the liquid crystal display apparatus and the changing of the light source 14 become convenient respectively.

Note that the present invention is not limited to the structure disclosed in the foregoing embodiment. For instance, in stead of the case where the light source 14 is disposed only at one end of the light guiding plate 12, light sources 14 may be disposed at respective both ends of the light guiding plate 12. The joint 16 may be composed of a screw and a tapped hole in stead of the coupling chip 31 and the coupling hole 32. The coupling chip 31 may be formed in the first supporting member 13 and the coupling hole 32 may be formed in the second supporting member 15. A dissipating member for dissipating the heat of the light source 14 may be formed in the rear side of the second supporting member 15 from the light guiding plate 12 view. In the foregoing embodiment, the coupling chip 31 is formed by the same material as that of the second supporting member 15. However, the metalic coupling section 15c of the second supporting member 15 may be used as the coupling chip 31. Note that a separate metalic member may be substituted for the coupling chip 31, the metalic member being provided apart from the metalic coupling section 15c. The material by which the first and second supporting members 13 and 15, and the coupling chip 31 are formed is not limited to the engineering plastic having a low heat transfer rate. Namely, the material may be selected from materials which are easy to be formed and have a superior heat cutting-off property.

Having described the preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

What is claimed is:

1. A liquid crystal display apparatus comprising:
   a liquid crystal display plate;
   light guiding means for guiding light to a rear surface of said liquid crystal display plate, the light guiding means having a first side face for receiving the light incident thereon;
   light source means for projecting the light toward said first side face, said light source means being placed beside said light guiding means;
   first supporting means for supporting said light guiding means;
   second supporting means for supporting said light source means in a surrounding manner around said light source means, the second supporting means being provided with an opening through which the light passing from said light source means to said first side face is transmitted; and
   coupling means for coupling said first and second supporting means so as to freely install and remove with each other.

2. The liquid crystal display apparatus as set forth in claim 1, wherein said coupling means includes a coupling chip which is formed in one of said first and second supporting means so as to couple to a coupling hole, the coupling hole being formed in the other of said first and second supporting means.

3. The liquid crystal display apparatus as set forth in claim 1, wherein said coupling means is made of a thermally insulating material.

4. The liquid crystal display apparatus as set forth in claim 1, wherein said light guiding means includes a light transmitting plate, said first side face being provided on said light transmitting plate.

5. The liquid crystal display apparatus as set forth in claim 4, wherein said light transmitting plate is disposed in a rear surface of said liquid crystal display plate so as to be parallel to said liquid crystal display plate.

6. The liquid crystal display apparatus as set forth in claim 4, wherein a diffusion sheet is adhered to a front surface of said light transmitting plate facing to said liquid crystal display plate while a reflecting sheet is adhered to a rear surface of said light transmitting plate.

7. The liquid crystal display apparatus as set forth in claim 1, wherein said first supporting means includes a frame for containing said liquid crystal display plate and light guiding means therein.

8. The liquid crystal display apparatus as set forth in claim 7, wherein said frame is provided with a displaying window having a size which corresponds to a regional area of an effective displaying area of said liquid crystal display plate.

9. The liquid crystal display apparatus as set forth in claim 7, wherein said frame includes upper and lower sections which catch therebetween said liquid crystal display plate and light guiding means, said frame being divisible into said upper and lower sections.

10. The liquid crystal display apparatus as set forth in claim 1, wherein said first supporting means has a first slit facing to said first side face, and said light source means projects the light toward said first side face through said first slit.

11. The liquid crystal display apparatus as set forth in claim 10, wherein said first supporting means includes a light transmitting plate for sealing said first slit therewith.

12. The liquid crystal display apparatus as set forth in claim 1, wherein said light source means includes a cold cathode ray tube of straight pipe type.

13. The liquid crystal display apparatus as set forth in claim 1, wherein said light source means includes a thermal cathode ray tube of straight pipe type.

14. The liquid crystal display apparatus as set forth in claim 1, wherein said second supporting means includes a frame for containing said light source means therein.

15. The liquid crystal display apparatus as set forth in claim 14, wherein said light source means includes a cold cathode ray tube of straight pipe type, leads, and harnesses, each top end of said leads being provided with the corresponding harness, wherein said respective harnesses are taken outside said frame.

16. The liquid crystal display apparatus as set forth in claim 1, wherein said second supporting means has a second slit formed on a position corresponding to said first side face, and said light source means projects the light toward said first side face through said second slit.

17. The liquid crystal display apparatus as set forth in claim 10, wherein said second supporting means has a second slit formed on a position corresponding to said first slit, and said light source means projects the light toward said first side face through said first and second slits.

18. The liquid crystal display apparatus as set forth in claim 16, wherein said second supporting means includes a light transmitting plate for sealing said second slit therewith.

19. The liquid crystal display apparatus as set forth in claim 17, wherein said second supporting means includes a light transmitting plate for sealing said second slit therewith.

20. The liquid crystal display apparatus as set forth in claim 1, wherein said first supporting means, said second supporting means and said coupling means are formed by a same thermal insulating material.

21. The liquid crystal display apparatus as set forth in claim 1, wherein said second supporting means includes upper and lower sections which catch therebetween said light source means, said upper and lower sections being divisible with each other.

22. The liquid crystal display apparatus as set forth in claim 14, wherein said frame includes upper and lower sections which catch therebetween said light source means, said upper and lower sections being divisible with each other.

23. The liquid crystal display apparatus as set forth in claim 21, wherein said second supporting means includes connecting means for coupling an end portion of said upper section and an end portion of said lower section, the end portions facing with each other.

24. The liquid crystal display apparatus as set forth in claim 23, wherein said coupling means includes a metalic member which can bend upon closing of said upper and lower sections.

25. The liquid crystal display apparatus as set forth in claim 22, wherein one end portion of said upper section and said lower section has a click and the other end portion of said upper and lower sections has a concave section such that said click couples to said concave section upon closing of said upper and lower sections, the end portions facing with each other.

26. The liquid crystal display apparatus as set forth in claim 2, wherein said first supporting means and said coupling chip are formed by a same thermal insulating material so as to be integrated with each other.

27. The liquid crystal display apparatus as set forth in claim 2, wherein said second supporting means and said coupling chip are formed by a same thermal insulating material so as to be integrated with each other.

28. The liquid crystal display apparatus as set forth in claim 2, wherein said coupling chip has a small hole around a center thereof, the coupling hole having a protrusion of a hemispherical shape thereinside, whereby said protrusion couples to said small hole upon installing of said coupling chip to said coupling hole.

29. The liquid crystal display apparatus as set forth in claim 1, wherein said second supporting means includes dissipating means for dissipating a heat generated by said light source means.

30. The liquid crystal display apparatus as set forth in claim 29, wherein said second supporting means includes a box frame for containing said light source means therein, and said dissipating means has a dissipating member in a rear side of said box frame from said light guiding means view.

31. The liquid crystal display apparatus as set forth in claim 1, wherein a clearance is provided between said first supporting means and said second supporting means so as to cut off a heat generated by said light source means.

32. The liquid crystal display apparatus as set forth in claim 2, wherein respective shapes of said coupling chip and coupling hole are adjusted such that a clearance, for cutting off a heat generated by said light source means, is provided between said first supporting means and said second supporting means.

* * * * *